US009862289B1

(12) United States Patent
Crecelius

(10) Patent No.: US 9,862,289 B1
(45) Date of Patent: Jan. 9, 2018

(54) DRIVE SYSTEM WITH LIMITED SLIP ELECTRIC DIFFERENTIAL DRIVE UNIT

(71) Applicant: AMERICAN AXLE & MANUFACTURING, INC., Detroit, MI (US)

(72) Inventor: David Crecelius, Cicero, IN (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 15/421,580

(22) Filed: Feb. 1, 2017

(51) Int. Cl.
*H02P 1/42* (2006.01)
*B60L 15/20* (2006.01)
*B60K 17/04* (2006.01)
*B60L 11/18* (2006.01)
*H02P 27/06* (2006.01)
*H02P 6/17* (2016.01)
*H02P 21/12* (2016.01)

(52) U.S. Cl.
CPC ........ *B60L 15/2054* (2013.01); *B60K 17/046* (2013.01); *B60L 11/1803* (2013.01); *H02P 6/17* (2016.02); *H02P 21/12* (2013.01); *H02P 27/06* (2013.01)

(58) Field of Classification Search
CPC ...... H02P 1/00; H02P 3/00; H02P 4/00; H02P 5/00; H02P 7/00; H02P 1/42; H02P 21/00; H02P 1/24
USPC .... 318/400.01, 400.02, 400.14, 400.15, 700, 318/800, 801, 805, 807, 432, 437, 701, 318/721, 727, 779, 799; 388/814, 930, 388/800; 363/40, 44, 95, 120, 174, 175
See application file for complete search history.

(56) References Cited

U.S. PATENT DOCUMENTS 5,099,186 A * 3/1992 Rippel .................. B60L 3/0023
                                                                     318/105
6,639,337 B1    10/2003 Nakano

* cited by examiner

*Primary Examiner* — Antony M Paul
(74) *Attorney, Agent, or Firm* — Harness, Dickey & Pierce, P.L.C.

(57) ABSTRACT

A limited slip electric drive system for a motor vehicle is disclosed. The system uses an induction motor having a stator, and first and second rotors disposed for independent rotation within the stator. The rotors are each independently associated with one wheel of the vehicle and are able to slip when the vehicle goes around a turn. A traction inverter and control system monitors angular speeds of the rotors and determines which of the rotors is turning slower than the other, and controls the induction motor in accordance with the rotor having a lower speed so that a torque signal is generated in accordance with the rotor having the lower speed.

17 Claims, 2 Drawing Sheets

DRIVE SYSTEM WITH LIMITED SLIP ELECTRIC DIFFERENTIAL DRIVE UNIT

FIELD

Figure 1:
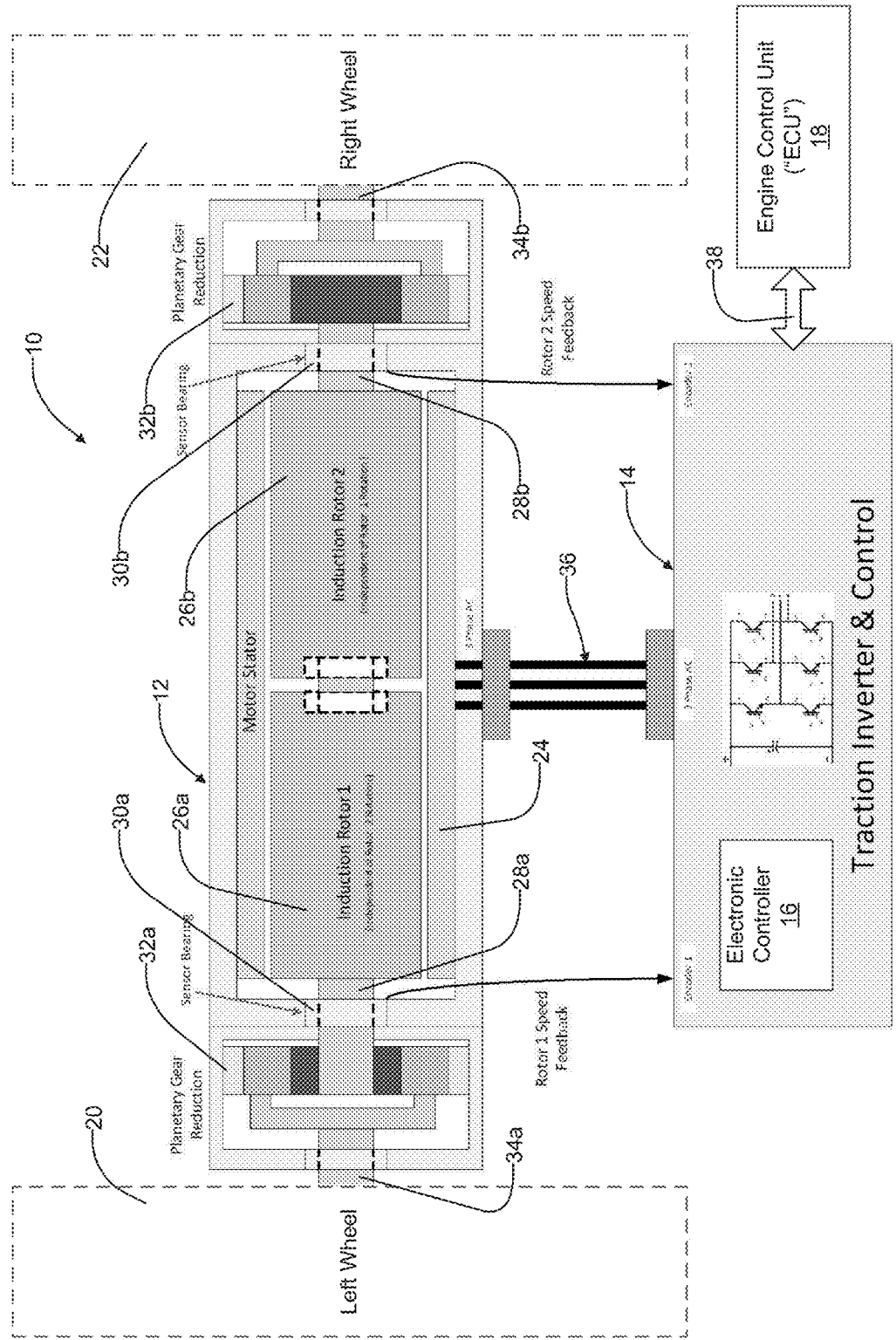

The present disclosure relates to drive systems for electric vehicles, and more particularly to a drive system that makes use of an induction motor for driving a pair of wheels of a vehicle, and where the induction motor includes fully independent and uncoupled induction rotors housed within a common stator, for driving a pair of wheels independently without the need for a conventional mechanical differential.

BACKGROUND

This section provides background information related to the present disclosure which is not necessarily prior art.

Present day electric vehicles, such as electrically powered automobiles, may employ an induction motor for providing a motive force to a pair of wheels. Typically the front wheels are powered, but in some instances all four wheels of the vehicle are powered: one motor for powering the front wheels and a separate motor for powering the rear wheels. It is also possible to power the rear wheels of the vehicle using a single electric motor. In any event, present day electrically powered vehicles typically require the use of a mechanical differential for receiving the output from the electrical motor and coupling the motive drive force to the driver and passenger side wheels of the vehicle. The driven wheels could be the front wheels of the vehicle or they could be the rear wheels of the vehicle.

The differential is needed because of the requirement that the driver and passenger side wheels need to rotate at different angular speeds when the vehicle is turning. The use of a mechanical differential, however, adds cost, complexity and weight to the vehicle. The mechanical differential also introduces mechanical losses which reduce the power made available to the wheels of the vehicle because of frictional losses within the differential.

One option for avoiding the use of a mechanical differential is by using two fully separate motors to independently drive a pair (either front or rear) of wheels of the vehicle. In this implementation typically two independent inverters are required, one for each motor, because of the need to be able to drive the wheels at different angular speeds when the vehicle is turning. As will be appreciated, this option also suffers from the drawbacks of additional cost and complexity because of the need for the second inverter.

SUMMARY

This section provides a general summary of the disclosure, and is not a comprehensive disclosure of its full scope or all of its features.

In one aspect the present disclosure relates to a limited slip electric drive system for a motor vehicle. The system may comprise an induction motor, with the induction motor including a stator. The induction motor may also include a first rotor disposed for rotation within the stator, the first rotor being associated with a first wheel of the vehicle, and a second rotor disposed for rotation within the stator. The second rotor may be associated with a second wheel of the vehicle and able to rotate within the stator independently of the first rotor. Each of the first and second rotors is able to slip relative to the other as needed when the vehicle is travelling around a turn. The system may also include a traction inverter and control system for monitoring an angular speed of each of the first and second rotors, and determining which of the first and second rotors is turning slower than the other. The traction inverter and control system may also operate to generate a signal for controlling the induction motor in accordance with one of the first or second rotors having a lower speed, so that a torque signal is generated in accordance with the rotor having the lower speed.

In another aspect the present disclosure relates to a limited slip electric drive system for a motor vehicle. The system may comprise an induction motor, and the induction motor may include a stator and a first rotor disposed for rotation within the stator. The first rotor may be associated with a first wheel of the vehicle. A second rotor may be included which is also disposed for rotation within the stator. The second rotor may be associated with a second wheel of the vehicle and able to rotate within the stator independently of the first rotor such that each of the first and second rotors is allowed to slip relative to the other when needed as the vehicle is travelling around a turn. The system may further include a first encoder associated with the first rotor and configured to detect a speed of the first rotor. A second encoder may be included which is associated with the second rotor and configured to detect a speed of the second rotor. The system may also include a traction inverter and control system. The traction inverter and control system may include a slip frequency calculation system for calculating a real time slip frequency of the induction motor. The traction inverter and control system may also include an encoder selection system responsive to signals from the first and second encoders and may be configured to determine and select for use a speed signal from the one of the first and second encoders that has a lower speed. The traction inverter and control system may operate to control the induction motor so that a torque signal is generated in accordance with the rotor having the lower speed.

In still another aspect the present disclosure relates to a method for forming a limited slip electric drive system for a motor vehicle. The method may comprise arranging a first rotor for rotation within a stator of an induction motor, the first rotor being associated with a first wheel of the vehicle on a driver side of the vehicle. The method may further comprise arranging a second rotor for rotation within the stator, the second rotor being associated with a second wheel of the vehicle on a passenger side of the vehicle, and rotating about a common axis with the first rotor, the second rotor further being able to rotate within the stator independently of the first rotor, and further such that the first and second rotors are able to rotate at different speeds as needed when the vehicle is travelling around a turn. The method may further comprise using a traction inverter and control system to monitor an angular speed of each of the first and second rotors while the vehicle is travelling, to determine which of the first and second rotors is turning slower than the other. The traction inverter and control system may also operate to control the induction motor so that so that a torque signal is generated in accordance with the rotor having the lower speed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
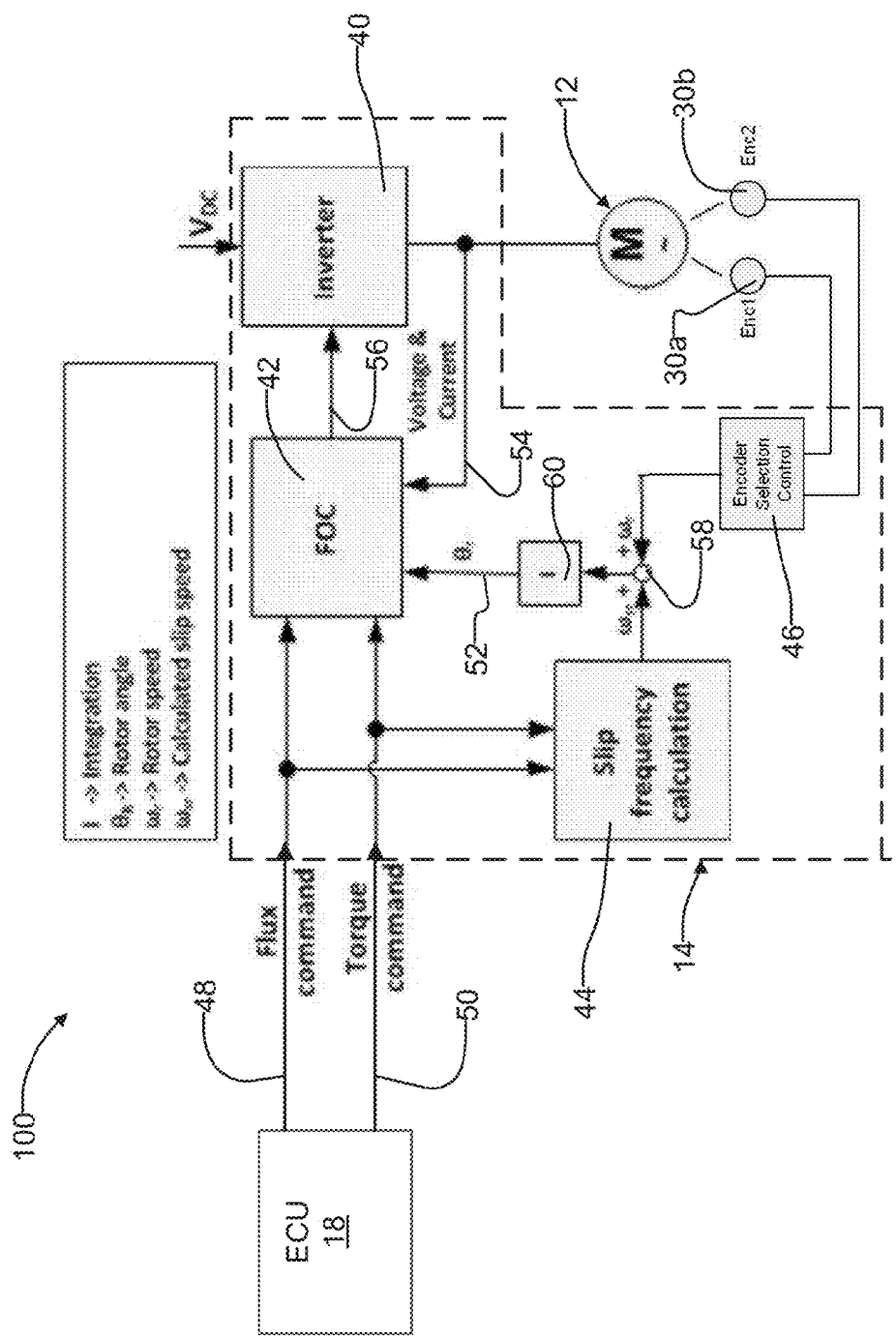

FIG. 1 is a high level block diagram of one embodiment of a drive system in accordance with the present disclosure; and FIG. 2 is a high level control diagram illustrating various components of the system of FIG. 1 along with operations that are performed in determining a wheel speed to use for each one of a pair of wheels being drive by the drive system.

Corresponding reference numerals indicate corresponding parts throughout the several views of the drawings.

DETAILED DESCRIPTION

Example embodiments will now be described more fully with reference to the accompanying drawings.

Referring to FIG. 1, a drive system 10 is shown in accordance with one embodiment of the present disclosure. The system 10 in this example may include an induction motor subsystem 12, and may also include a traction inverter and control system 14 (hereinafter simply "inverter system 14"). The inverter system 14 may include an electronic controller 16 and is in communication with a processor controlled vehicle engine control unit ("ECU") 18. The induction motor subsystem 12 is used simultaneously to provide a motive drive force to drive a left wheel 20 and a right wheel 22 of an automotive vehicle such as a car or truck. However, it will be appreciated immediately that the system 10 is not limited to use with only automobiles, and in fact is expected to find utility on any type of wheeled vehicle where the wheels are driven by an electric motor and the vehicle needs to be propelled while making turns. The teachings of the present disclosure may even find utility in connection with any type of device which is powered by an electric motor, and for which two simultaneously driven elements having slightly different angular speeds need to be produced.

The induction motor subsystem 12 in this example includes a stator 24 in which two fully independent rotors 26a and 26b are housed. The rotors 26a and 26b rotate about a common longitudinal axis but are uncoupled from one another, and thus are free to rotate at different angular speeds, such as when the vehicle is making a turn and the outside wheel 20 or 22 has a higher angular speed than the inside wheel.

Rotor 26a has an output shaft 28a and rotor 26b has an output shaft 28b. Output shaft 28a may be supported by, and its speed monitored by, a sensor/bearing assembly forming an encoder 30a, while rotor 26b may be supported by, and its speed monitored by, a sensor/bearing assembly forming an encoder 30b. The output shaft 28a may alternatively be coupled to a planetary gear reduction system 32a, while output shaft 28a may alternatively be coupled to a separate planetary gear reduction system 32b. The planetary gear reduction systems 32a and 32b may be coupled to axles 34a and 34b associated with the wheels 20 and 22, and provide a drive force to each wheel in accordance with the output from the wheel's associated planetary gear reduction system 32a or 32b. It will be appreciated that in some applications the planetary gear reduction systems 32a and 32b may not be required. However, it is expected that the planetary gear reduction system 32a and 32b will likely be required for automotive applications.

The inverter system 14 receives angular speed signals from the sensor/bearing assemblies and the electronic controller 16 may be used to process these signals when determining a real time, three-phase AC voltage drive signal, which may be applied via a suitable power bus 36 to the coil windings (not visible in FIG. 1) on the stator 24 to commutate the induction motor subsystem 12. The electronic controller 16 may also communicate with the engine ECU 18 of the vehicle via a suitable communications bus 38 (e.g., a controller area network bus), and may use information from various sensors in generating the three phase AC drive signal applied to the induction motor subsystem 12.

Referring to FIG. 2, a control diagram 100 is shown illustrating various operations and subsystems that the system 10 may use in generating the three phase AC voltage drive signal for the motor subsystem 12. The inverter system 14 may include an inverter section 40, and optionally a field oriented control system (FOC) 42, and optionally a slip frequency calculation system 44, and optionally an encoder selection control subsystem 46.

The ECU 18 provides a flux command 48 and a torque command 50 to the FOC 42 in the form of direct current (DC) voltage signals, as well as to the slip frequency calculation system 44. The FOC 42 may use the flux command 48, the torque command 50, along with a real time rotor angle signal (Θr) 52, and optionally a voltage and/or current feedback signal 54, to generate three phase AC voltages 56 which are applied as drive signals to the inverter section 40. As will be appreciated, the inverter may be a conventional inverter that makes use of MOSFETs or insulated gate bipolar junction transistors (IGBTs) as the switching devices to control application of the drive signals in a manner to commutate the motor subsystem 12. Such circuits are well known in the industry and therefore no additional description shall be provided for the inverter section 40. The inverter section 40 applies the drive signals sequentially to various coils wound on the stator 24 of the motor subsystem 12 as needed to commutate the motor subsystem 12. Encoders 30a and 30b provide speed signals to indicate the real time rotational speed of each of the rotors 26a and 26b, respectively. The encoders 30a and 30b output their real time speed signals to the encoder selection control subsystem 46.

The encoder selection control subsystem 46 may include one or more control algorithms that select the rotor (26a or 26b) that has the lower rotational speed at the moment, and then may output a corresponding speed signal that will eventually be used to determine the angular position (Θr) signal. For example, if the vehicle is moving forward turning clockwise, then the rotor, in this example rotor 26b on the passenger side of the vehicle, will have the lower angular speed, and the rotor 26a on the driver side of the vehicle will have a higher angular speed because its wheel needs to turn faster when the vehicle is making a clockwise turn. The opposite would occur if the vehicle was making a counter-clockwise turn. So in this example, since rotor 26b has the lesser angular speed of the two rotors 26a and 26b, then its speed will be used by the encoder selection control subsystem 46. The slip frequency calculation system 44 uses the torque and flux commands to calculate the real time slip frequency for the motor subsystem 12 and to output a signal relating to the real time calculated slip speed of the rotor ($\omega_{sr}$). This signal may then be summed with the output from the encoder selection control subsystem 46 at summing node 58 and the summed output applied to an integrator 60. The integrator 60 produces the real time rotor angle signal 52 which may then be output to the FOC 42.

It will be appreciated that the system 10 is predicated on the fact that the torque acting on the rotor of a conventional induction motor is created by a slip frequency, or more specifically by the difference between the synchronous speed of the magnetic field caused by selective energization of the stator windings and the rotational speed of the rotor. The slip frequency is commonly expressed (or measured) in revolutions per minute (RPM). The measured slip will increase with increasing load, thus providing an increasing torque. In a traction application the torque is commanded and subsequently generated by controlling the slip frequency within the stator 24 winding. Feedback for an induction machine is typically obtained through a velocity signal from an incremental encoder associated with the rotor. With the system 10, the use of two independent rotors 26a and 26b allows two encoders 30a and 30b to be used to independently determine the speeds of the two rotors. Since absolute position is not required, the two rotors 26a and 26b within the single stator 24 can "slip" with respect to each other. In other words, one rotor 26a or 26b is able to turn at a faster angular speed than the other when the vehicle is turning a corner, and where the inside wheel will be rotating at a slower angular speed, and therefore requiring greater torque, than the outside wheel. Even though the rotors (26a and 26b) are split into 2 sections within the stator 24, there is only one slip frequency that can be controlled in the stator 24 by the inverter system 14. When the vehicle is traveling in a straight line both rotors 26a and 26b are turning at the same velocity and are seeing the same slip frequency, as if the rotors were one unit. When the vehicle begins to turn, then one rotor (26a or 26b) will begin to have a higher velocity that the other. Assuming the control algorithm running in the controller 16 selects the rotational velocity of the slower spinning rotor, then the faster spinning rotor (26a or 26b) will see a smaller slip frequency compared to the other and subsequently less torque will be generated on that rotor shaft. If the faster spinning rotor (26a or 26b) continues to increase its velocity, at some point it will generate zero torque when its slip frequency is equal to the stator's 24 rotating electric field. This condition could occur in low traction conditions where one tire is on a lower friction surface than the other tire. With a standard open differential all the torque would go to the spinning tire resulting in zero tractive force to move the vehicle. In the present invention all the torque is transferred to the slower spinning tire to provide the best possible tractive force to move the vehicle. The system 10 thus operates as a mechanical differential with a limited slip differential function without the need for a costly mechanical differential.

It should also be noted that in this example stator 24 contains a conventional distributed 3 phase winding (or other conventional winding of various phases or distribution architectures). Meaning that stator 24 could be interchanged with an induction motor with a single continuous rotor and operate with similar single output shaft performance. No special winding configurations are implemented or needed within the stator 24.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A limited slip electric drive system for a motor vehicle comprising:
   an induction motor, the induction motor including:
      a stator;
      a first rotor disposed for rotation within the stator, the first rotor being associated with a first wheel of the vehicle;
      a second rotor disposed for rotation within the stator, the second rotor being associated with the second wheel of the vehicle and able to rotate within the stator independently of the first rotor, each of the first and second rotors being able to slip relative to the other as needed when the vehicle is travelling around a turn; and
   a traction inverter and control system for monitoring an angular speed of each of the first and second rotors, determining which of the first and second rotors is turning slower than the other, and generating a signal for controlling the induction motor in accordance with the one of the first or second rotors having a lower speed, so that a torque signal is generated in accordance with the rotor having the lower speed.

2. The system of claim 1, wherein the traction inverter and control system includes a first encoder associated with the first rotor, and a second encoder associated with the second rotor.

3. The system of claim 2, wherein the traction inverter and control system includes an encoder selection control system in communication with the first and second encoders, that is configured to detect which of the first and second rotors is turning at a slower speed, and for selecting a speed signal from the one of the first and second rotors that has a slower speed for use in determining a torque command to be applied to the rotor having the slower speed.

4. The system of claim 3, wherein the traction inverter and control system further includes a slip frequency calculation system for calculating a slip frequency for the induction motor.

5. The system of claim 4, wherein the traction inverter and control system further includes:
   an inverter section; and
   a field oriented control system for receiving a flux command and a torque command, and determining a three phase AC voltage signal to be applied to the inverter section.

6. The system of claim 5, wherein the field oriented control system also receives a signal representing real time rotor angle for the one of the first and second rotors that is determined to have the slower speed.

7. The system of claim 1, further comprising:
   a first planetary gear reduction system driven by the first rotor; and
   a second planetary gear reduction system driven by the second rotor.

8. A limited slip electric drive system for a motor vehicle comprising:
   an induction motor, the induction motor including:
      a stator;
      a first rotor disposed for rotation within the stator, the first rotor being adapted to drive a first wheel of the vehicle;
      a second rotor disposed for rotation within the stator, the second rotor being adapted to drive a second wheel of the vehicle, the second rotor being rotatable within the stator independently of the first rotor such that each of the first and second rotors is allowed to slip relative to the other when needed as the vehicle is travelling around a turn;
      a first encoder coupled to the first rotor and configured to detect a position of the first rotor relative to the stator;
      a second encoder coupled to the second rotor and configured to detect a position of the second rotor relative to the stator;
      a traction inverter and control system including:
         a slip frequency calculation system for calculating a real time slip frequency of the induction motor; and an encoder selection system responsive to signals from the first and second encoders and being configured to determine a speed signal that is representative of a rotational speed of one the first and second rotors having lower rotational speed than the other one of the first and second rotors, the speed signal being based on an output of one of the first and second encoders that is associated with the one of the first and second rotors having lower rotational speed;

wherein the traction inverter and control system is configured to control the induction motor so that a torque signal is generated in accordance with the one of the first and second rotors having the lower speed.

9. The system of claim 8, wherein the traction inverter and control system further includes a field oriented control system for generating a three phase AC voltage drive signal.

10. The system of claim 9, wherein the traction inverter and control system further includes an inverter responsive to the field oriented control system for generating signals applied to the induction motor to commutate the induction motor.

11. The system of claim 8, further comprising:
a first planetary gear reduction system driven by the first rotor; and
a second planetary gear reduction system driven by the second rotor.

12. A method for forming a limited slip electric drive system for a motor vehicle, the method comprising:
arranging a first rotor for rotation within a stator of an induction motor, the first rotor being associated with a first wheel of the vehicle on a driver side of the vehicle;
arranging a second rotor for rotation within the stator, the second rotor being associated with a second wheel of the vehicle on a passenger side of the vehicle and rotating about a common axis with the first rotor, the second rotor further being able to rotate within the stator independently of the first rotor so that the first and second rotors are able to rotate at different speeds as needed when the vehicle is travelling around a turn;

using a traction inverter and control system to monitor an angular speed of each of the first and second rotors while the vehicle is travelling, to determine which of the first or second rotors is turning slower than the other, and using the traction inverter and control system to control the induction motor so that so that a torque signal is generated in accordance with the one of the first and second rotors that is turning slower than the other one of the first and second rotors.

13. The method of claim 12, wherein using the traction and control system to control the induction motor comprises using a field oriented control system to receive motor flux and motor torque command signals and to generate a three phase AC voltage signal for driving the induction motor.

14. The method of claim 13, wherein using the traction and control system to control the induction motor further comprises using an inverter responsive to the three phase AC signal voltage drive signal to generate signals for commutating the induction motor.

15. The method of claim 14, wherein a first encoder is coupled to the first rotor, wherein a second encoder is coupled to the second rotor, and wherein using the traction and control system to control the induction motor further comprises using an encoder selection control to receive signals from the first and second encoders and to use the signals from the first and second encoders to determine the one of the first and second rotors that is turning slower than the other one of the first and second rotors.

16. The method of claim 15, wherein using the traction and control system to control the induction motor further comprises using a slip frequency detection system to detect a real time slip frequency of the induction motor.

17. The method of claim 12, further comprising:
using a first planetary gear reduction system interposed between the first rotor and the first wheel; and
using a second planetary gear reduction system interposed between the second rotor and the second wheel.

* * * * *

UNITED STATES PATENT AND TRADEMARK OFFICE
CERTIFICATE OF CORRECTION

| | | |
|---|---|---|
| PATENT NO. | : 9,862,289 B1 | |
| APPLICATION NO. | : 15/421580 | |
| DATED | : January 9, 2018 | |
| INVENTOR(S) | : David Crecelius | |

It is certified that error appears in the above-identified patent and that said Letters Patent is hereby corrected as shown below:

In the Specification

In Column 2, Summary, Line 53, after "so that", delete "so that".

In Column 4, Detailed Description, Line 17, delete "(Or)" and insert --0r--, therefor.

In Column 4, Detailed Description, Line 39, delete "(Or)" and insert --0r--, therefor.

In the Claims

Column 7, Line 5, of Claim 8, after "having", insert --a--.

Column 7, Line 10, of Claim 8, before "lower", insert --the--.

Column 8, Line 7, of Claim 12, after "so that", delete "so that".

Signed and Sealed this
Twentieth Day of February, 2018

Andrei Iancu
*Director of the United States Patent and Trademark Office*